May 26, 1925.
W. H. OSTERHOUT
1,538,904
MEANS FOR DECARBONIZING ENGINE CYLINDERS
Filed Nov. 15, 1921
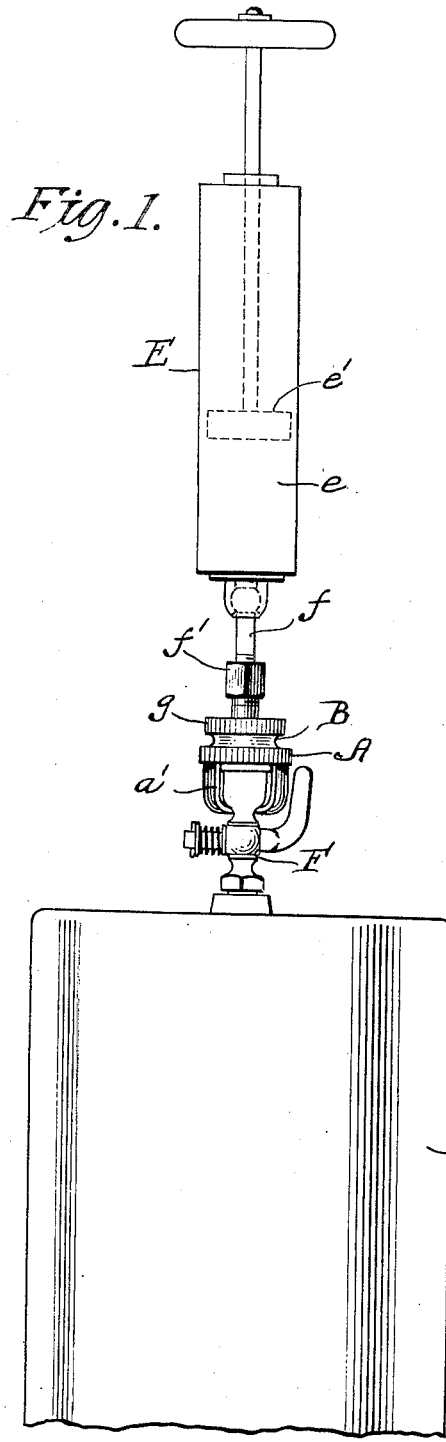
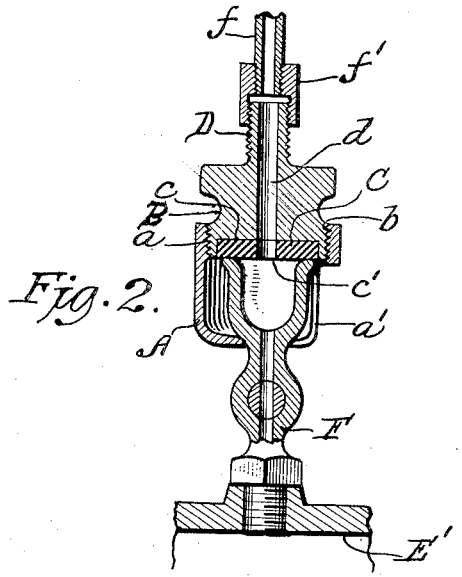
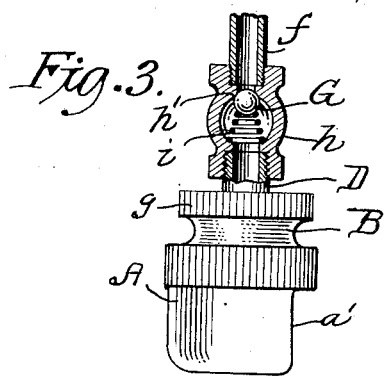
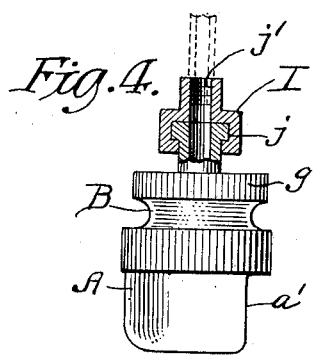
INVENTOR
William Hurley Osterhout
BY
ATTORNEY Patented May 26, 1925.

1,538,904

UNITED STATES PATENT OFFICE.

WILLIAM HURLEY OSTERHOUT, OF NEW YORK, N. Y., ASSIGNOR TO CHARLES F. KINSMAN, OF NEW YORK, N. Y.

MEANS FOR DECARBONIZING ENGINE CYLINDERS.

Application filed November 15, 1921. Serial No. 515,211.

*To all whom it may concern:*

Be it known that I, WILLIAM HURLEY OSTERHOUT, a citizen of the United States, residing at the city of New York, borough of Manhattan, county and State of New York, have invented a certain new and useful Means for Decarbonizing Engine Cylinders, of which the following is a specification.

This invention is a means for eliminating deposits of carbon within the cylinders of an internal combustion engine.

The object in view is to introduce an agent in the form of a solvent for the carbon deposits whereby said agent decomposes and loosens the carbon deposits to the end that the same may be discharged from the engine cylinders.

According to this invention the agent is forcibly introduced while the engine cylinder is in a heated condition and is at rest, as a result of which the solvent is vaporized so as to completely fill the interior of the cylinder and the valve chamber in the engine head. The vapor expands within the chamber so as to have access to carbon deposits present in remote and accessible localities within the cylinders and valve chamber, thereby attaining efficiency and rapidity in the operation of making free the carbon deposits.

In a preferred constructional form, my invention embodies a coupling adapted to be applied to the cup of an ordinary pet cock or priming cup, said coupling being easily and quickly positioned on the cup. The coupling is constructed with means for effecting an air tight connection with the pet cock, or other part of the engine, and said coupling is provided, furthermore, with means for the ready attachment of a forcing device, such as a hand pump, whereby a desired quantity of the decarbonizing agent may be introduced under pressure through the pet cock and forced directly into the chamber containing the valves and pistons.

Other functions and advantages of the invention will appear from the following description taken in connection with the drawings, wherein—

Figure 1 is a side elevation of a portion of a cylinder and a pet cock with my device applied in position for effecting the introduction under pressure of a decarbonizing agent.

Figure 2 is a vertical section on an enlarged scale of the coupling positioned on the pet cock.

Figures 3 and 4 are views in vertical section illustrating other embodiments of my coupling.

As shown in Figures 1 and 2, my invention is embodied in a coupling comprising the co-operating members A B and a gasket C. The member A is shown as a shell provided at one end with a female thread $a$, said shell being cut away at the bottom and on one side to produce the slot $a'$. Member B is in the form of a plug provided with a male thread $b$ at its lower part and provided also with a recess $c$ in the under face. Said plug is adapted to be screwed into the member A by having threads $b$ of the plug mesh with threads $a$ of the coupling, and within the recess $c$ of the plug is seated and secured the gasket C.

Said plug is provided with a longitudinal bore or passage $d$ in register with an aperture $c'$ of the gasket. Extending upwardly from the plug is a tubular nipple D which is in register with the passage $d$, said nipple being provided with a male screw thread.

E designates a forcing device, which in the example shown is a force pump comprising a cylinder $e$ and a piston $e'$. As shown, the cylinder pump is provided with an eduction tube $f$ having a union $f'$ adapted to be screwed on the threaded nipple D of the coupling, whereby the forcing device may be readily attached to the coupling and removed at will from the same.

The plug B is shown as extending upwardly from the shell, said plug being provided with a milled edge $g$ for gripping the same by hand in order to rotate the plug within the shell.

My device is used in connection with a suitable part on an engine cylinder E', and as shown this part is a priming cup or pet cock F.

The device is used in the following manner: After the engine stops running and while the cylinders are in a hot condition, the operator proceeds to apply the coupling by slipping the cut out part $a'$ of the shell A over the mouth of the cock F and thereafter the plug B is rotated until the gasket C has a firm bearing upon the edge of the cup, as shown in Figure 2. The pump E is now charged with a desired quantity of the decarbonizing agent, such as alcohol, and said pump is positioned over the coupling, in alinement therewith, as depicted in Figure 1, the union $f'$ being rotated for attaching the pump to the nipple D of the coupling. The foregoing operations are quickly performed, and while the engine is in a hot condition, the pump is operated to eject therefrom a quantity of the liquid solvent, the same passing through the nipple, the plug, the gasket and the pet cock, and thence into the cylinder, said pet cock being quickly closed to preclude the escape of the solvent. The contact of the liquid solvent (alcohol) with the hot walls of the engine cylinder or chamber at once vaporizes the liquid, hence it is desirable to make provision for forcing the solvent under pressure into the heated chamber. The vapor resulting from the volatilization of the liquid solvent accumulates within the heated chamber and penetrates to all portions thereof so as to have access to all carbon deposits on such surfaces as may be inaccessible ordinarily and as are readily accessible to the usual flame. By using alcohol, or an equivalent, and vaporizing the same within the heated closed chamber, the resulting vapor is confined within said chamber for a substantial period of time so as to decompose the carbon deposit and free the same from adhesion to the surfaces of the chamber, whereby the free carbon may be discharged or blown out by again starting the engine into operation.

The device is applied easily to the pet cock for the forcible introduction of the solvent, and it is apparent that said device may be disconnected from one pet cock and applied to other pet cocks of the engine so as to subject the various cylinders and valve chambers to the action of the solvent.

It is desirable in some instances to provide a check valve within the coupling in order to minimize the escape of the vapors from the heated cylinder and valve chamber during the operation of the pump for the introduction of the solvent. In Figure 3 of the drawings, I have shown such a check valve at G, the same being encased within a suitable shell $h$ provided with a valve seat $h'$ and a spring $i$ whereby the valve is normally held to its seat, although the valve is free to open downwardly under the pressure of the liquid ejected by the pump.

As shown in Figure 1, the operation of attaching the pump to the coupling requires said pump to be bodily rotated, but as this may involve some inconvenience to the operator, I may and preferably do employ a pump connection in the form of a gland I swiveled at $j$ on the nipple as shown in Figure 4, said gland being provided with a threaded socket $j$ to which the pump pipe $f$ may be coupled by rotating the gland I on its swiveled connection $j$ of the coupling.

Having thus fully described the invention, what I claim as new and desire to secure by Letters Patent is:

1. In a device for introducing a decarbonizing agent into engine cylinders, a two-part coupling one of which is a shell cut away for lateral application to a priming cock, and the other part is a plug screwed into said shell, combined with a forcing device attachable to said plug.

2. In a device for introducing a decarbonizing agent into engine cylinders, a coupling embodying a movable part adapted to be fitted with a gas tight connection to the mouth of a priming cock, said coupling being demountable at will from said priming cock by lateral and rotary movements in combination with a forcing device attachable to said coupling.

3. In a device for introducing a decarbonizing agent into engine cylinders, a demountable coupling provided with means for tight engagement with a priming cock, said means embodying provision for relative lateral and rotary movements of the cock and coupling, a forcing device, and valve means whereby the escape of a volatile solvent is minimized at the period of its introduction into a heated cylinder.

4. In a device for introducing a decarbonizing agent into engine cylinders, the combination of a coupling having means for tight engagement with a priming cup by relative lateral and rotary movements thereof, a forcing device, and a rotatable member swiveled on the coupling and attachable to said forcing device.

5. A device for introducing a decarbonizing agent into engine cylinders, embodying a coupling having means for lateral application to a priming cock, and a member relatively rotatable and provided with a sealing member for direct bearing against the edge of said priming cock.

In testimony whereof I have hereto signed my name this 10 day of November, 1921.

WILLIAM HURLEY OSTERHOUT.